(12) United States Patent
Ng

(10) Patent No.: US 6,862,554 B2
(45) Date of Patent: Mar. 1, 2005

(54) MONITORING AND PREVENTING FAILURE OF AN AUTOMATED THEATER SYSTEM

(75) Inventor: Joseph S. Ng, Montebello, CA (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 10/213,220

(22) Filed: Aug. 6, 2002

(65) Prior Publication Data

US 2003/0204372 A1 Oct. 30, 2003

Related U.S. Application Data

(60) Provisional application No. 60/376,179, filed on Apr. 29, 2002.

(51) Int. Cl.[7] .......................... G06F 11/30; G06F 15/00; G21C 17/00
(52) U.S. Cl. ..................................... 702/184; 340/3.43
(58) Field of Search ................................ 702/182–185, 702/187, 188; 340/3.43; 725/32–105, 111

(56) References Cited

U.S. PATENT DOCUMENTS

| | | | | |
|---|---|---|---|---|
| 3,878,322 A | * | 4/1975 | Sullivan ....................... 725/16 |
| 4,893,248 A | * | 1/1990 | Pitts et al. ................... 705/400 |
| 5,786,994 A | * | 7/1998 | Friz et al. ...................... 700/79 |
| 6,141,530 A | * | 10/2000 | Rabowsky ................... 725/116 |
| 6,160,477 A | * | 12/2000 | Sandelman et al. ......... 340/506 |
| 6,384,893 B1 | * | 5/2002 | Mercs et al. ................. 352/133 |
| 6,411,678 B1 | * | 6/2002 | Tomlinson et al. ........ 379/1.01 |
| 6,587,647 B1 | * | 7/2003 | Watanabe et al. .............. 399/8 |
| 2002/0026265 A1 | * | 2/2002 | Takahashi et al. .......... 700/275 |
| 2002/0056081 A1 | * | 5/2002 | Morley et al. ................. 725/1 |
| 2002/0077711 A1 | * | 6/2002 | Nixon et al. .................. 700/51 |
| 2002/0095679 A1 | * | 7/2002 | Bonini ........................ 725/74 |
| 2002/0122052 A1 | * | 9/2002 | Reich et al. ................ 345/716 |
| 2003/0023408 A1 | * | 1/2003 | Wight et al. ................ 702/187 |

OTHER PUBLICATIONS

Merriam–Webster's Collegiate Dictionary, Tenth Edition, p. 981. 1999.*

* cited by examiner

Primary Examiner—Hal Wachsman
Assistant Examiner—Manuel L. Barbee
(74) Attorney, Agent, or Firm—Gates & Cooper LLP

(57) ABSTRACT

An apparatus and method for maintaining operation of an automated theater are disclosed. An exemplary system includes an exhibitor support center for monitoring functional status of each of one or more exhibitor systems and for responding to failures at each of the one or more exhibitor systems. A secure network connection is provided from the exhibitor support center to each of the one or more exhibitor systems to communicate the functional status. The exhibitor support center can also initiate scheduled maintenance and extended diagnostic testing at the exhibitor systems.

36 Claims, 7 Drawing Sheets

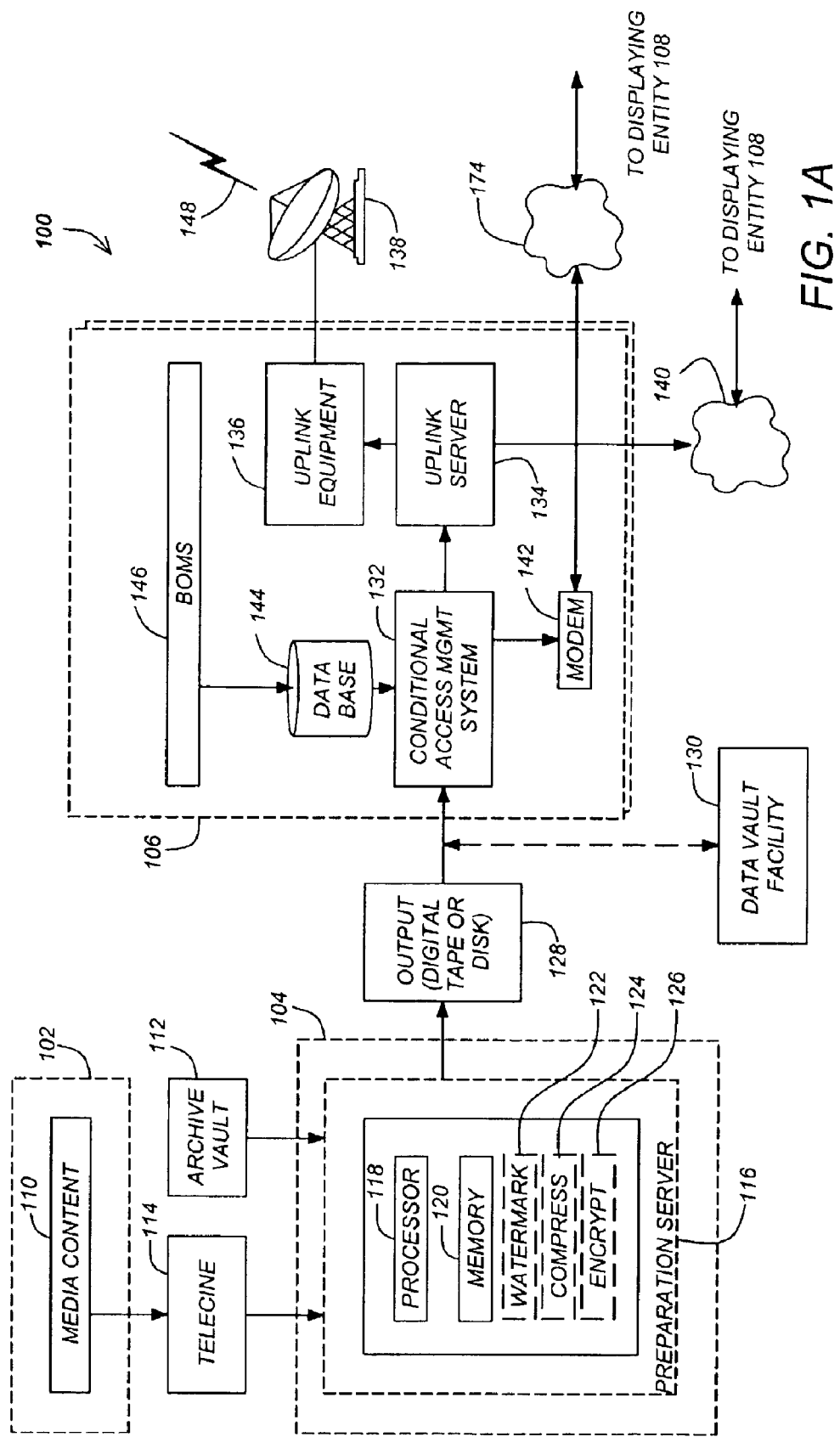

MONITORING AND PREVENTING FAILURE OF AN AUTOMATED THEATER SYSTEM

CROSS-REFERENCE TO RELATED APPLICATIONS

This application claims the benefit under 35 U.S.C. §119 (e) of the following co-pending and commonly-assigned U.S. patent application, which is incorporated by reference herein:

U.S. Provisional Patent Application No. 60/376,179, filed Apr. 29, 2002, by Joseph S. Ng and entitled "METHOD TO MONITOR AND PREVENT FAILURE OF AN AUTOMATED THEATER SYSTEM".

This application is related to the following co-pending and commonly-assigned U.S. patent applications, which are both incorporated by reference herein:

U.S. Provisional Application Ser. No. 60/376,105, filed Apr. 29, 2002, by Charles F. Stirling, Bernard M. Gudaitis, William G. Connelly and Catherine C. Girardey, entitled "SECURE DATA CONTENT DELIVERY SYSTEM FOR MULTIMEDIA APPLICATIONS UTILIZING BANDWIDTH EFFICIENT MODULATION"; and U.S. Provisional Application Ser. No. 60/376,244, filed Apr. 29, 2002, by Ismael Rodriguez and James C. Campanella, entitled "A METHOD TO SECURELY DISTRIBUTE LARGE DIGITAL VIDEO/DATA FILES WITH OPTIMUM SECURITY".

BACKGROUND OF THE INVENTION

1. Field of the Invention

The present invention relates to systems and methods for an automated theater system. Particularly, this invention relates to systems and methods to prevent failure of an automated digital cinema system.

2. Description of the Related Art

Complex equipment is difficult to maintain. Maintenance personnel require extensive training. Spare inventory is expensive and difficult to control. Systems such as digital cinema systems, which include satellite communication, smart card, computer server, high-speed networking and high intensity optical projector technologies are extremely advanced and complicated. These systems require maintenance technicians with a wide scope of knowledge, who are very costly to train and retain. System reliability is vital to the success of a revenue generating program such as digital cinema.

Currently there are a very few digital cinema exhibitor (theater) installations in the world. The few digital cinema exhibitor installations that do exist are not operating full time. When they are in operation, factory technicians are on-site with spare parts to assure the equipment is operating properly. Existing approaches to system maintenance will not support a large-scale deployment of the digital cinema.

Consequently, there is a need for automated and efficient systems and methods for maintaining complex digital cinema systems. There is further a need for such systems and methods to minimize the necessary training and expertise of maintenance personnel.

SUMMARY OF THE INVENTION

Embodiments of the present invention involve the use of automatic local and remote diagnostics, communication network and a maintenance infrastructure for an automated theater system to minimize down time and lower the overall maintenance costs.

Embodiments of the invention use modern automatic local and remote diagnostics in conjunction with communication networks and a maintenance infrastructure to predict and prevent failure of an automated digital cinema theater system. This system will centrally monitor thousands of digital cinema exhibitor (theater) systems. Preventive maintenance actions will be communicated to onsite technicians with clear instructions and required parts will also be sent from the central site to the theater. Pending failure will also be diagnosed; repair procedure and required parts will be sent from the central site to the theater. With this invention, the digital cinema exhibitor (theater) will not be required to retain specialized maintenance technicians, maintain a large inventory of spare parts and will be able to minimize down time.

For example a typical maintenance system embodiment of the invention includes an exhibitor support center for monitoring functional status of each of one or more exhibitor systems and responding to a failure at any of the one or more exhibitor systems and a secure network connection from the exhibitor support center to each of the one or more exhibitor systems to communicate the functional status. The exhibitor support center can include a database tracking operational status, failure statistics, system configuration, conditional use privileges and exhibition schedule for each of the one or more exhibitor systems.

In response to a failure, the exhibitor support center can automatically initiate delivery of parts to repair the failure and initiate a message to a technician. The message can be an e-mail message and/or a page. Furthermore, the message can include instructions regarding repairing the failure.

Each of the one or more exhibitor systems includes a plurality of subsystems, each subsystem including a failure detection and management system correcting any failure and at least one redundant component. The failure detection and management system of each subsystem attempts to activate the appropriate redundant component in response to a detected failure in the subsystem. Failures are communicated to the exhibitor support center. Typically, subsystems of the exhibitor systems include at least one receiver for receiving media content, a server for storing and processing the media content from the receiver, one or more display devices for displaying the media content from the server, a network for communicating the media content from the server to one or more display devices and a modem for communicating data for administration functions of the exhibitor system to a network operation center.

If the subsystem failure detection and management system is unable to resolve a failure, the exhibitor support center attempts to reconfigure the exhibitor system. If the exhibitor support center is unable to reconfigure the exhibitor system the exhibitor support center initiates a message to an exhibitor support center engineer. Thus, the failure is given increasing priority until the failure is resolved.

In further embodiments, the exhibitor support center directs scheduled maintenance at each of the one or more exhibitor systems. The exhibitor support center can automatically initiate delivery of parts for the scheduled maintenance and a message to a technician regarding the scheduled maintenance. The message can be in the form of an e-mail message and/or a page. Furthermore, the message can include instructions regarding performance of the scheduled maintenance. In addition, the exhibitor support center can adjust maintenance and diagnostic testing schedules in response to a global report from the database which tracks maintenance and repairs.

Finally, the exhibitor support center can also direct scheduled extended diagnostic testing at each of the one or more exhibitor systems. The exhibitor support center can initiate a repair procedure if any problems are indicated by the extended diagnostic testing.

BRIEF DESCRIPTION OF THE DRAWINGS

Referring now to the drawings in which like reference numbers represent corresponding parts throughout:

FIGS. 1A & 1B depict a top-level functional block diagram of one embodiment of a typical media program distribution system;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

Figure 1B:
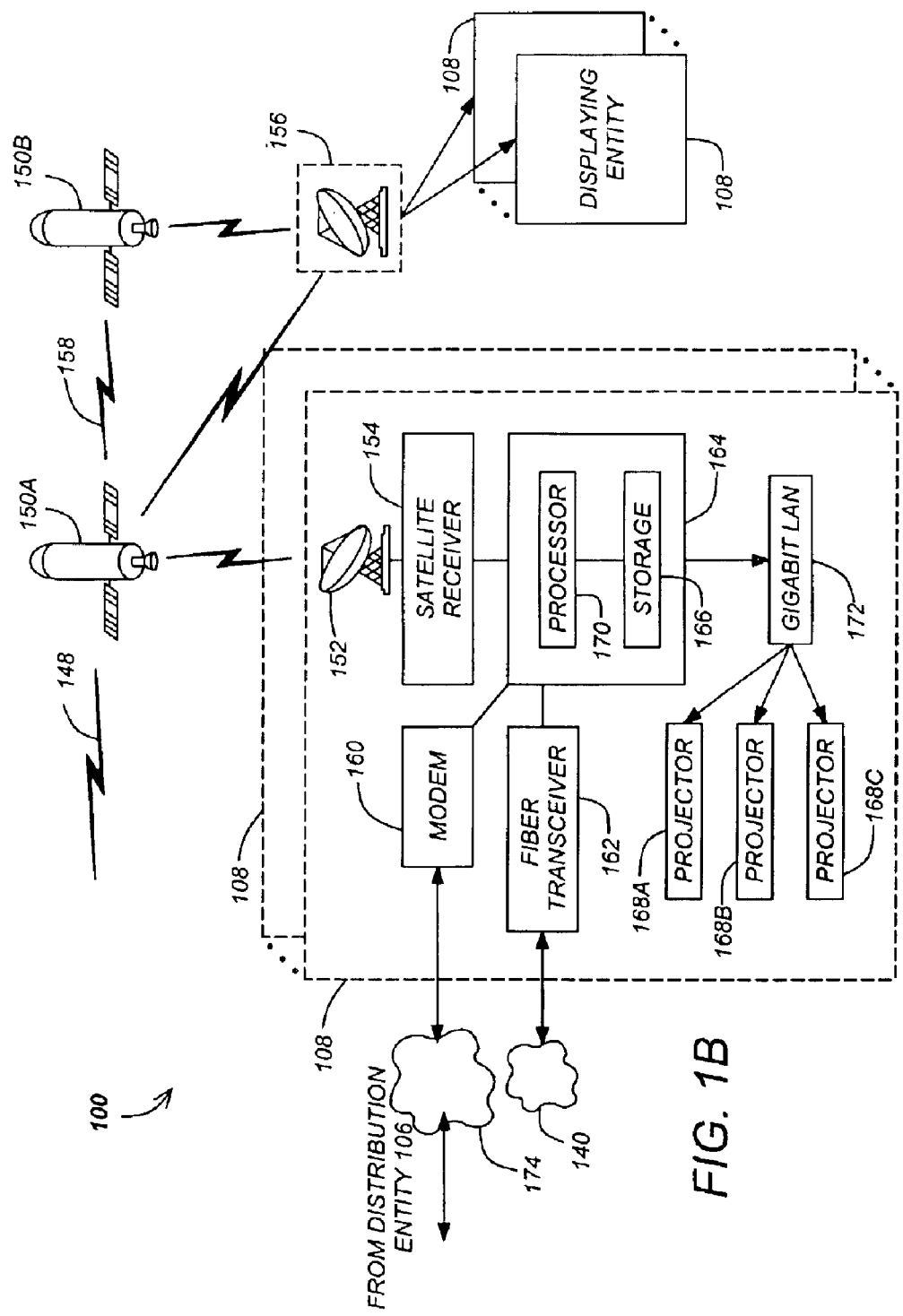

FIGS. 1A and 1B depict a top-level functional block diagram of one embodiment of a media program distribution system 100 (alternately referred to as an automated cinema system). The media distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 to the media content 110 to protect it. In addition, the preparation processor can also apply compression 124 to the media content 110. Once prepared, the output media content 128 can be transferred to digital tape or a disk (e.g. a DVD, laserdisk, or similar medium). The output media content 128 can then be archived in a data vault facility 130 until it is needed.

When needed, the prepared output media content 128 is then provided to the distribution entity 106 (alternatively referred to hereinafter as the network operations center [(NOC)]. Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities or exhibitor systems 108 (shown in FIG. 1B). This is accomplished by the uplink equipment 136 and uplink antenna 138. Also, as shown, in addition or in the alternative to transmission via satellite, the media program can be provided to the displaying entity 108 via a forward channel fiber network 140. Additionally, information may be transmitted to displaying entity 108 via a modem 142 using, for example, a public switched telephone network line, fiber network or other suitable communications network. A land based communication such as through modem 142 is referred to as a back channel 174. Thus, information can be transmitted to and from the displaying entity 108 via the back channel 174, forward channel fiber network 140 or the satellite 150 network. Typically, the back channel 174 provides data communication for administration functions (e.g. billing, authorization, usage tracking, etc.), while the forward channel fiber network 140 or satellite 150 network provides for transfer of the output media content 128 through transceiver 162 and/or receiver 154 to the displaying entities 108.

The output media content 128 may be securely stored in a database 144. Data is transferred to and from the database 144 under the control and management of the business operations management system (BOMS) 146. Thus, the BOMS 146 manages the transmission of information to displaying entity 108, and assures that unauthorized transmissions do not take place.

Turning to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

Figure 2:
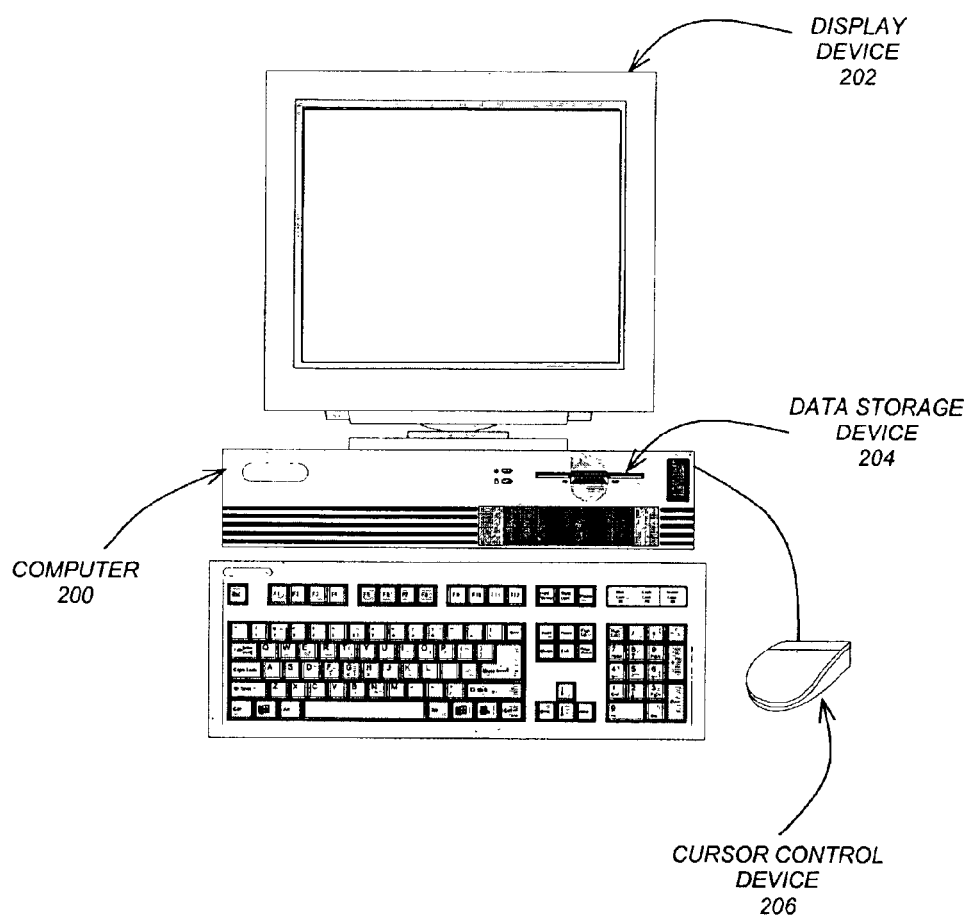
FIG. 2 is a functional block diagram of a computer system that can be used to perform the operations of the media preparation processor.

A typical displaying entity or exhibitor system 108 comprises a modem 160 for receiving and transmitting information through the back channel 174 (i.e., via a communication path other than that provided by the satellite system or forward channel fiber network 140 described above) to and from the distribution entity 106. For example, feedback information (e.g. relating to system diagnostics, billing, usage and other administrative functions) from the exhibitor system 108 can be transmitted through the back channel 174 to the distribution entity 106. The output media content 128 and other information may be accepted into a processing system 164 (also referred to as a content server) such as a computer similar to that which is illustrated in FIG. 2 (see description below). The output media content 128 may then be stored in the storage device 166 for later transmission to displaying systems (e.g., digital projectors) 168A–168C. Before storage, the output media content 128 can be decrypted to remove transmission encryption (e.g. any encryption applied by the CAMS 132), leaving the encryption applied by the preparation processor 116.

When the media content 110 is to be displayed, final decryption techniques are used on the output media content 128 to substantially reproduce the original media content 110 in a viewable form which is provided to one or more of the displaying systems 168A–168C. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 10 can be communicated to the displaying systems 168A–168C over an independently encrypted network 172, such as on a gigabit LAN.

FIG. 2 is a functional block diagram of a computer system 200 that can be used to perform the operations of the media preparation processor 116, processing system 164 as well as an exhibitor support center 304 (detailed hereafter). Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200.

Programs executing on the computer 200 (such as an operating system) are comprised of instructions which, when read and executed by the computer 200, causes the computer 200 to perform the steps necessary to implement and/or use the present invention. Computer programs and/or operating instructions may also be tangibly embodied in a memory and/or data communications devices of the computer, thereby making a computer program product or article of manufacture according to the invention. As such, the terms "article of manufacture," "program storage device" and "computer program product" as used herein are intended to encompass a computer program accessible from any computer readable device or media.

2. Digital Cinema Maintenance System

Figure 3:
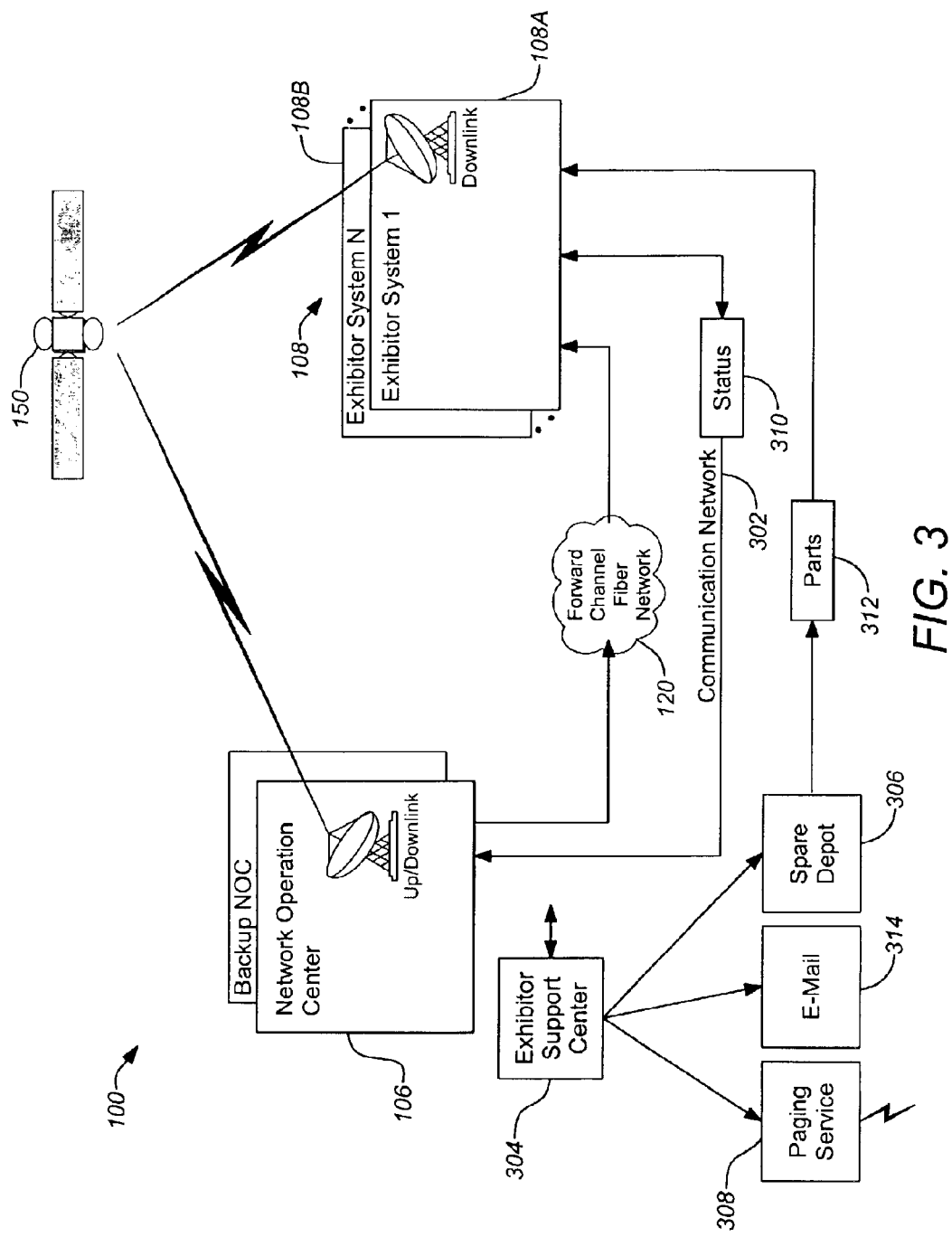
FIG. 3 is a block diagram of a typical digital cinema maintenance system of the invention.

FIG. 3 is a block diagram of a typical automated cinema maintenance system 300. The maintenance system can function as an integral component within the general architecture of an automated cinema system 100, such as that previously detailed. Typical embodiments of the invention involve three major components of the automated cinema system 100, the network operation center 106, an exhibitor system (ES) 108 and a communication system 302. The network operation center 106 can include an exhibitor support center (ESC) 304 to operate as the central maintenance and diagnostics site. One or more exhibitor systems 108 are the entities being monitored. Status messages 310 which can include diagnostic as well as failure information are reported back to the exhibitor support center 304 over the communication system 302. Finally, the communication system 302 provides a link between exhibitor support center 304 and the exhibitor systems 108.

In general, the exhibitor support center 304 monitors the functional status of the exhibitor systems 108 and responds to any failures detected at the individual exhibitor sites. For example, depending upon the type of failure indicated, a response can include an automated order for parts 312 from a spare depot 306 delivered directly to the exhibitor system 108 and/or transmitting an automated notification to the appropriate repair personnel via a communication service 308 such as a paging service.

Figure 4:
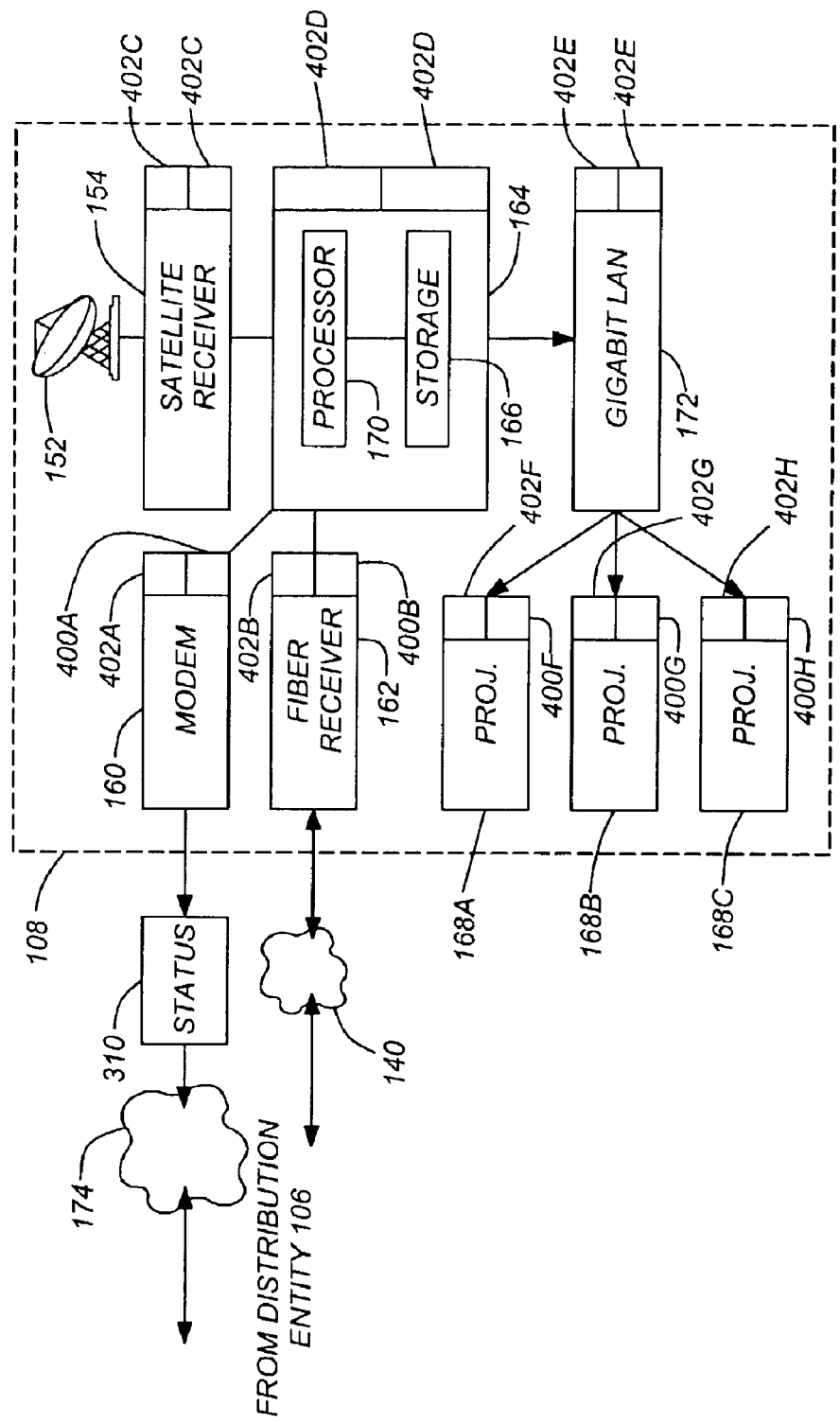
FIG. 4 is a block diagram of the maintenance system components at a typical exhibitor site.

FIG. 4 is a block diagram of the maintenance system components and operations at a typical exhibitor site. As previously detailed, in the exhibitor system 108 there are typically five major subsystems, the receivers (satellite 154 and/or fiber 162), a content server 164 (including content management, data storage, file decryption, decompression, etc.), gigabit LAN 172, and digital projectors 168.

As part of the automated maintenance system 100, each of these subsystems has built in redundant key components 400A–400H and a failure detection and management system 402A–402H. During the power on process each subsystem will perform an initial self diagnostic to verify its operational readiness. If there is any failure detected, the failed component will be automatically replaced by the redundant component 400A–400H. Upon the completion of the initial self diagnostic each subsystem will report its status information 310 to the exhibitor support center 304 through the communication system 302. The failure detection and management system 402A–402H will continue to monitor the subsystem as it operates for any failures.

Within the exhibitor system 108, diagnostic and system status information 310 can be routed through the existing connections between the components or through a separate diagnostic and maintenance communication network. For example, in one embodiment the server 164 tracks and compiles all diagnostic and system status information 404 and then relays that information out through the modem 160 via the back channel 174 to the exhibitor support center 304; the back channel 174 functions as the communication system 302 for the exhibitor support center 304. Alternately, the information 404 can be communicated over a separate network connection, independent from the functional connections of the automated theater system 100.

During the exhibitor systems 108 normal operation each subsystem continually monitors its operation and switches to redundant components 400A–400H if required. A status message 310 will be communicated back to the exhibitor support center 304 whenever a switch to a redundant component 400A–400H occurs. Under command from the exhibitor support center 304, a subsystem in the exhibitor system 108 may be switched to a redundant component 400A–400H or reconfigured for proper operation of the exhibitor system 108. Furthermore, at scheduled times each subsystem will report its status back to the exhibitor support center 304. In addition, major events (such as the light in the digital projector 168 being turned on or turn off) will generate a status message to the exhibitor support center 304. If any subsystem of an exhibitor system 108 is powered down, it will also generate a message notifying the exhibitor support center 304.

Figure 5:
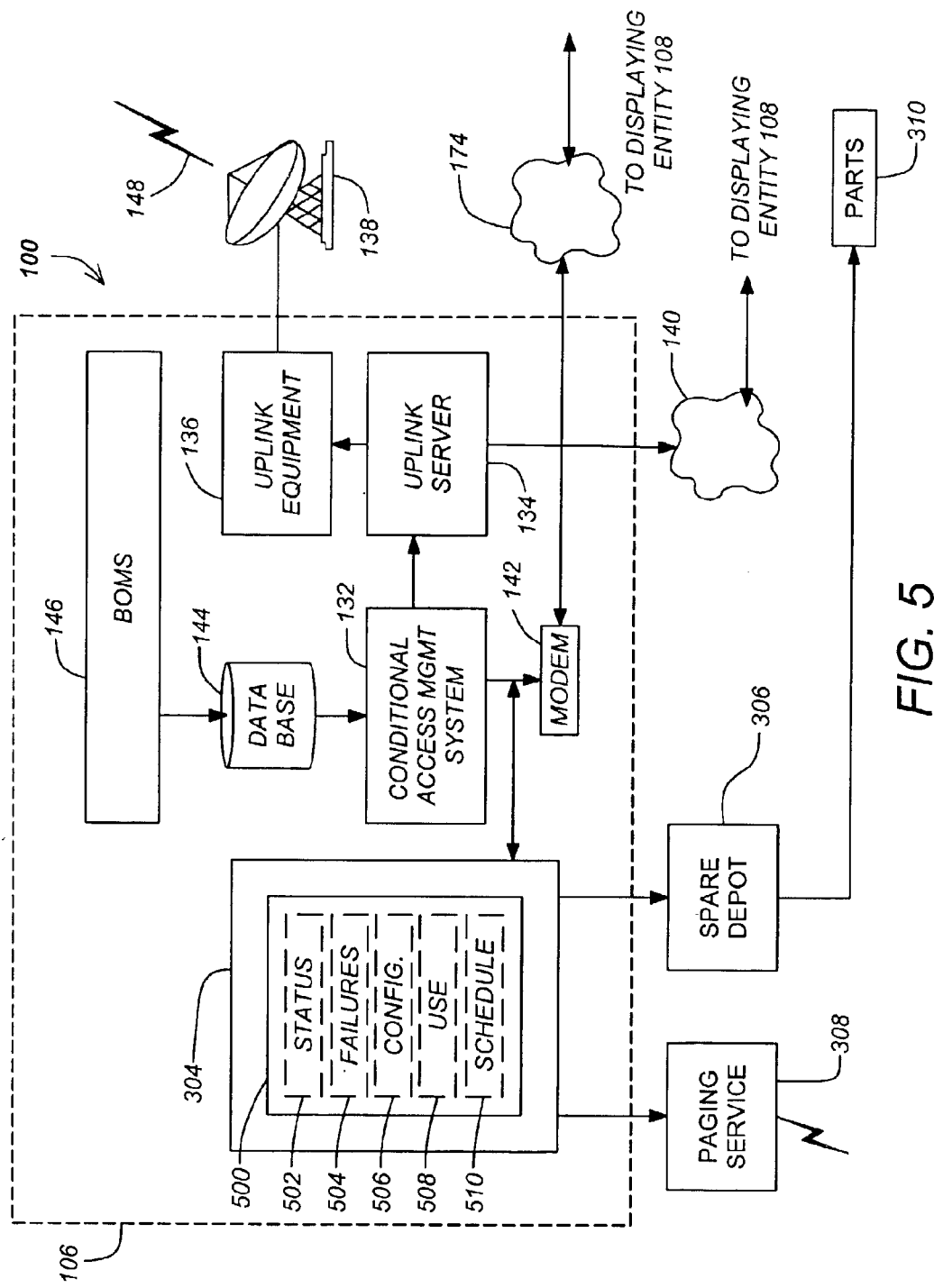
FIG. 5 is a block diagram of the maintenance system components at a typical network operations center.

FIG. 5 is a block diagram of the maintenance system components at a typical network operations center 106. The exhibitor support center 304 is the heart of the automated exhibitor system 108 monitoring and failure prevention system. A comprehensive database 500 for all exhibitor systems 108 is kept in the exhibitor support center 304, it tracks operational status 502, failure statistics 504, system configuration 506, conditional use privileges 508 and each exhibitor's schedule 510. In a typical system there are as many as seven major functions triggered and coordinated by the exhibitor support center 304 as detailed hereafter.

Figure 6:
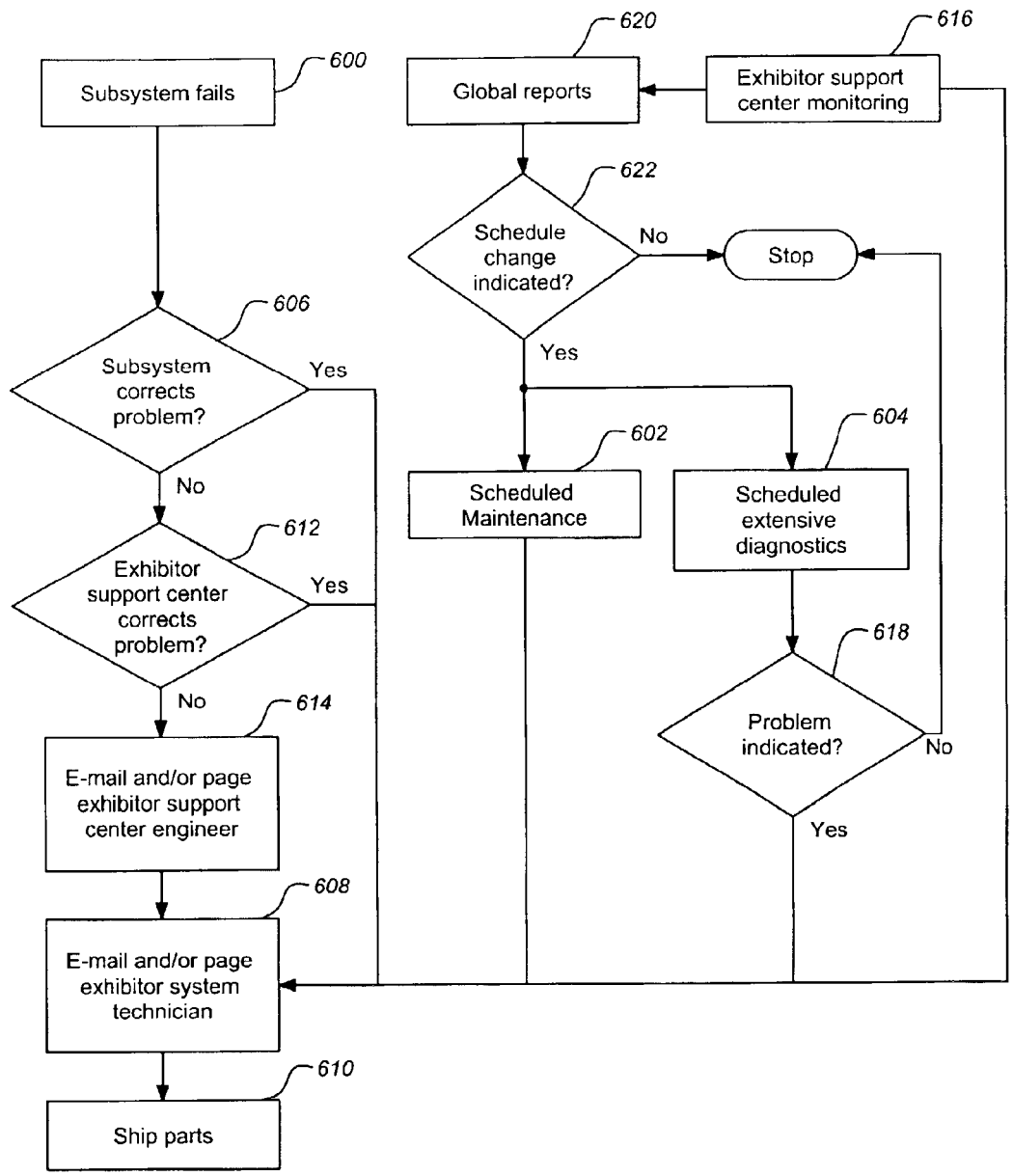
FIG. 6 is a flowchart of the typical functions of a maintenance and repair system of the invention.

FIG. 6 is a flowchart of the typical functions of a maintenance and repair system of the invention. In general, the system responds either to a subsystem failure 600 or a schedule (scheduled maintenance 602 or scheduled diagnostics 604). Whenever a subsystem fails the exhibitor support center 304 is notified in a status message 310.

2.1 Subsystem Failure Response

The failed subsystem first attempts to correct the problem directly at decision block 606. Based on the status messages 310 from the exhibitor system 108, if a subsystem fails and corrects the problem (e.g. by switching to a redundant component 400A–400H), a message will be sent via e-mail 314 and/or alphanumeric pager 308 to the exhibitor's maintenance technician at block 608. The technician will be informed of the failure and provided information regarding the shipment of replacement parts 312. The exhibitor support center 304 will automatically order replacement parts 312 for the failed components which will be shipped to the exhibitor system 108 at block 610. In addition, repair instructions can be included in the e-mail 314 notification to the maintenance technician.

2.2 Exhibitor Support Center Failure Response

However, if a status message 310 from the exhibitor subsystem indicates a failure, but that subsystem is not able to resolve the problem (e.g., by invoking a redundant component 400A–400H), the exhibitor support center 304 will attempt to remotely reconfigure the exhibitor system 108 to mitigate the problem at decision block 612. The process then continues to block 608 where a message is sent via e-mail 314 and/or alphanumerical pager 308 to the exhibitor's maintenance technician. The technician will be informed of the failure and provided information regarding the shipment of replacement parts 312. Then replacement parts 312 for failed components are automatically shipped to the exhibitor system 108 at block 610. Repair instructions can be included in the e-mail notification to the maintenance technician.

Various scenarios for remote reconfiguration by the exhibitor support center are possible. For example, if the failure occurs within displaying system 168A and the cause is a memory failure, such that some but not all memory is available to it's input processor, the failure detection and management system 402F will determine the root cause. If there is no additional memory (i.e., a redundant component 400F) and the failure detection and management system 402F is otherwise unable to resolve the issue, the system 402F will report the problem to the exhibitor support center 304. The exhibitor support center 304 may then determine that, although the input processor is unable to receive data from the network 172 at it's maximum speed, it can receive at a slower speed. The exhibitor support center 304 will remotely reconfigure the exhibitor system 108, directing the network 174 to reduce the speed of data flow to the failed displaying system 168A to maintain operation of the exhibitor system 108. Concurrently, maintenance procedures will also be initiated (i.e., messaging the technician and ordering replacement components). In general, reconfiguration by the exhibitor support center 304 is possible when the subsystem failure is a "partial" failure and/or an adjustment to one or more other subsystems can temporarily reduce or eliminate the impact.

2.3 Automated Technician Response to Unresolved Failure

If a status message 310 from the exhibitor subsystem indicates a failure, but that subsystem is not able to resolve the problem and the exhibitor support center is also not able to automatically resolve the problem (e.g. by reconfiguring the exhibitor system 108), a message (via status message, e-mail and/or alphanumerical pager) to the exhibitor support center's on duty engineer at block 614. The process then continues to block 608 where a message is sent via e-mail 314 and/or alphanumerical pager 308 to the exhibitor's maintenance technician. The technician is informed of the failure and provided information regarding the shipment of replacement parts 310. Replacement parts 310 for failed components will be automatically shipped at block 610 to the exhibitor system 108. Here, too, repair instructions can be included in the e-mail 314 notification to the maintenance technician.

2.4 Automated Preventive Maintenance

At block 602 scheduled maintenance can also prompt action at an exhibitor system 108. For example, each day the exhibitor support center 304 will review the preventative maintenance schedule for all exhibitor subsystems. If a preventive maintenance action is required, the process moves to block 608 where a message will be sent via e-mail 314 and/or alphanumerical pager 308 to the exhibitor's maintenance technician. The technician will be informed of the necessary maintenance action and provided information regarding the shipment of maintenance parts 312 (e.g., filters, projector bulbs, etc.). Maintenance parts 312 will be automatically shipped to the exhibitor system 108 at block 610. Preventative maintenance instructions can be included in the e-mail notification to the maintenance technician.

2.5 Automated Maintenance and Repair Monitoring

At block 616 the exhibitor support center 304 monitors all maintenance and repairs performed at the exhibitor systems 108. The exhibitor support center 304 will keep track of all repair and preventive maintenance actions to ensure that each action is completed and validate that the exhibitor system 108 is fully functional. For example, the exhibitor support center 304 will confirm that the exhibitor systems 108 are not left operating on redundant components 400A–400H for too long as this exposes the system to a risk of shutting down if the redundant component should fail. Monitoring can be performed through the regular status messages from the exhibitor system 108 to the exhibitor support center 304. As necessary, reminder messages and/or pages can be sent to the exhibitor system technician at block 608. (Parts will not be resent as they should already be on site from the original failure/maintenance.)

2.6 Automated Diagnostics and Scheduled Maintenance

Based on the exhibitor's presentation schedule, the exhibitor support center 304 will periodically schedule and direct the exhibitor system 108 to execute extensive diagnostics at block 604. At decision block 618, if any problems are detected, the process moves to block 608 where a message will be sent via e-mail 314 and/or alphanumerical pager 308 to the exhibitor's maintenance technician. The technician will be informed of the failure and provided information regarding the shipment of replacement parts 312. Replacement parts 312 for failed components will be automatically shipped to the exhibitor system 108 at block 610. Again, repair instructions can be included in the e-mail notification to the maintenance technician.

2.7 Flexible Failure and Maintenance Management System

The exhibitor support center 304 is aware of the status of all exhibitor systems 108 through the monitoring at block 616. At block 620, comprehensive global reports regarding system status are generated by schedule or upon demand. In this way, the health of the overall automated theater system 100 is tracked. The comprehensive reports can be used to identify when more frequent scheduled maintenance and/or diagnostics are required at decision block 622. For example, if a particular projector 168C component has been identified as causing a number of failures (e.g. switching to redundant component 400H), the maintenance frequency for the component can be increased for all such projectors 168C to reduce the occurrence of failures. Consolidating all the maintenance and failure information across all the exhibitor systems 108 will serve to constantly aid in preventing failure and improve the response to their occurrence.

3. Communication Architecture

The communication system 302 provides communication paths between the exhibitor support center 304 and the exhibitor systems 108. The communication system 302 also participates in the diagnostic process. The communication system 302 supporting the exhibitor support center 304 can be autonomous or integrated into the communication system of the automated theater system. For example, the back channel 174 which is used to communicate other information related to the operation of the automated theater system 100 can also be used to convey the status information 310 of the exhibitor systems 108.

The communication system 302 operates through network connections provided at each of the exhibitor systems 108 as well as the exhibitor support center 304. A network connection embodies the communication access point of one entity to another entity, but not necessarily the totality of the physical communication system 302 supporting that access. For example, a network connection can be supported by the Internet, but providing a network connection does not require the operator to provide the entire network infrastructure. A secure network connection can be provided by operating a virtual private network over a distributed unsecured network, such as the Internet.

CONCLUSION

This invention will provide an automated system to monitor and prevent failure of an exhibitor system in a cost-effective matter and will make large-scale digital cinema deployment possible.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A maintenance system for an automated theater, comprising:
    an exhibitor support center for monitoring functional status of each of one or more exhibitor systems and responding to a failure at any of the one or more exhibitor systems; and
    a secure network connection from the exhibitor support center to each of the one or more exhibitor systems to communicate the functional status;
    wherein each of the exhibitor systems includes a plurality of subsystems, each subsystem includes a failure detection and management system correcting any failure and at least one redundant component, the failure detection and management system activates the redundant component in response to a detected failure in the subsystem, the failure detection and management system communicates any failures to the exhibitor support center, and the exhibitor support center attempts to reconfigure the exhibitor system if the failure detection and management system is unable to correct the failure.

2. The system of claim 1, wherein the exhibitor support center includes a database tracking operational status, failure statistics, system configuration, conditional use privileges and exhibition schedule for each of the one or more exhibitor systems.

3. The system of claim 2, wherein the exhibitor support center adjusts maintenance and diagnostic testing schedules in response to a global report from the database.

4. The system of claim 1, wherein the exhibitor support center automatically initiates delivery of parts to repair the failure.

5. The system of claim 1, wherein the exhibitor support center initiates a message to a technician in response to a failure at any of the one or more exhibitor systems.

6. The system of claim 5, wherein the message is an e-mail message.

7. The system of claim 5, wherein the message includes instructions regarding repair of the failure.

8. The system of claim 5, wherein the message is a page.

9. The system of claim 1, wherein the plurality of subsystems includes:
    at least one receiver for receiving media content;
    a server for storing and processing the media content from the receiver;
    one or more display devices for displaying the media content from the server;
    a network for communicating the media content from the server to one or more display devices; and
    a modem for communicating data for administration functions of the exhibitor system to a network operation center.

10. The system of claim 1, wherein the exhibitor support center initiates a message to an exhibitor support center engineer if the exhibitor support center is unable to reconfigure the exhibitor system.

11. The system of claim 1, wherein the exhibitor support center further directs scheduled maintenance at each of the one or more exhibitor systems.

12. The system of claim 11, wherein the exhibitor support center automatically initiates delivery of parts for the scheduled maintenance.

13. The system of claim 11, wherein the exhibitor support center initiates a message to a technician regarding the scheduled maintenance.

14. The system of claim 13, wherein the message is an e-mail message.

15. The system of claim 13, wherein the message includes instructions regarding the scheduled maintenance.

16. The system of claim 13, wherein the message is a page.

17. The system of claim 1, wherein the exhibitor support center further directs scheduled extended diagnostic testing at each of the one or more exhibitor systems.

18. The system of claim 17, wherein the exhibitor support center initiates a repair procedure if any problems are indicated by the extended diagnostic testing.

19. A method of maintenance for an automated theater, comprising:
    communicating functional status over a secure network connection to an exhibitor support center from each of one or more exhibitor systems;

monitoring functional status of each of one or more exhibitor systems at the exhibitor support center; and responding to a failure at any of the one or more exhibitor systems;

wherein each of the exhibitor systems includes a plurality of subsystems, each subsystem includes a failure detection and management system correcting any failure and at least one redundant component, the failure detection and management system activates the redundant component in response to a detected failure in the subsystem, the failure detection and management system communicates any failure to the exhibitor support center, and the exhibitor support center attempts to reconfigure the exhibitor system if the failure detection and management system is unable to correct the failure.

20. The method of claim 19, wherein monitoring functional status includes tracking operational status, failure statistics, system configuration, conditional use privileges and exhibition schedule for each of the one or more exhibitor systems in a database at the exhibitor support center.

21. The method of claim 20, wherein the exhibitor support center adjusts maintenance and diagnostic testing schedules in response to a global report from the database.

22. The method of claim 19, wherein responding to a failure includes automatically initiating delivery of parts to repair the failure.

23. The method of claim 19, wherein responding to a failure includes initiating a message to a technician in response to a failure at any of the one or more exhibitor systems.

24. The method of claim 23, wherein the message is an e-mail message.

25. The method of claim 23, wherein the message includes instructions regarding repair of the failure.

26. The method of claim 23, wherein the message is a page.

27. The method of claim 19, wherein the plurality of subsystems includes:

at least one receiver for receiving media content;

a server for storing and processing the media content from the receiver;

one or more display devices for displaying the media content from the server;

a network for communicating the media content from the server to one or more display devices; and a modem for communicating data for administration functions of the exhibitor system to a network operation center.

28. The method of claim 19, wherein the exhibitor support center initiates a message to an exhibitor support center engineer if the exhibitor support center is unable to reconfigure the exhibitor system.

29. The method of claim 19, further comprising directing scheduled maintenance at each of the one or more exhibitor systems from the exhibitor support center.

30. The method of claim 29, wherein the exhibitor support center automatically initiates delivery of parts for the scheduled maintenance.

31. The method of claim 29, wherein the exhibitor support center initiates a message to a technician regarding the scheduled maintenance.

32. The method of claim 31, wherein the message is an e-mail message.

33. The method of claim 31, wherein the message includes instructions regarding the scheduled maintenance.

34. The method of claim 31, wherein the message is a page.

35. The method of claim 19, further comprising directing scheduled extended diagnostic testing at each of the one or more exhibitor systems from the exhibitor support center.

36. The method of claim 35, wherein the exhibitor support center initiates a repair procedure if any problems are indicated by the extended diagnostic testing.

* * * * *